Nov. 19, 1935.  M. H. MARTIN  2,021,797

CAR TRUCK

Filed March 7, 1934   3 Sheets-Sheet 1

Inventor
Mark H. Martin

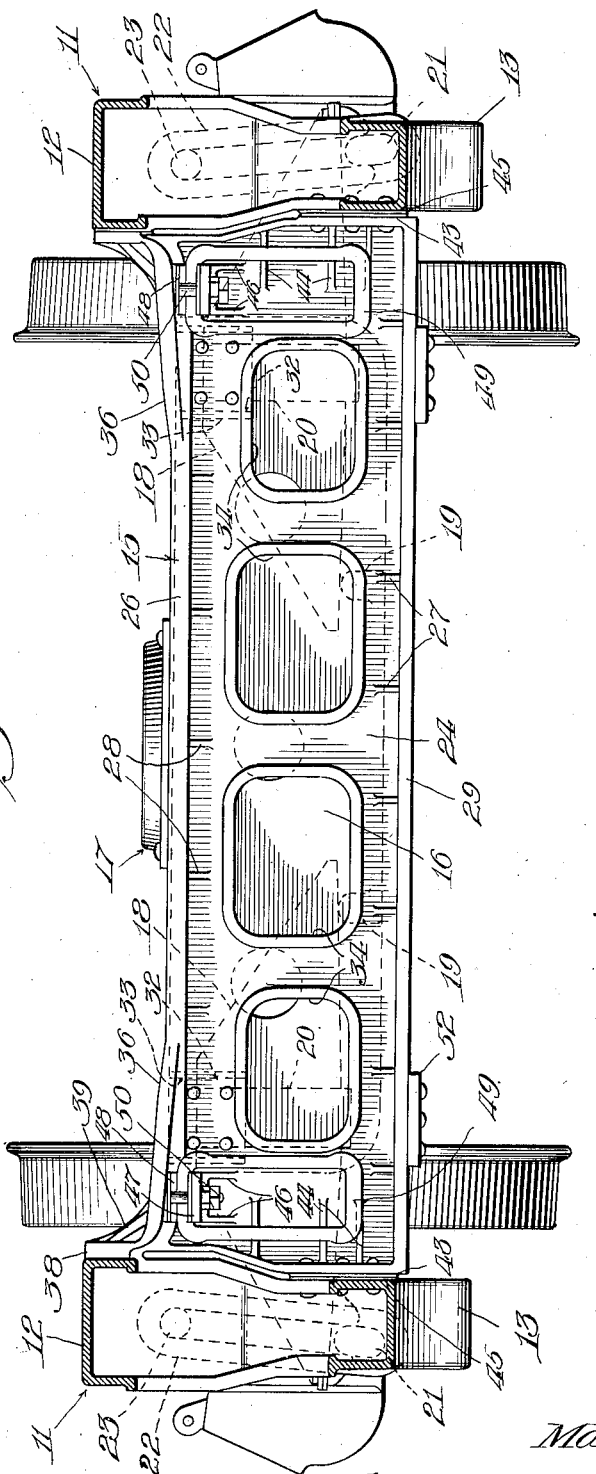

Nov. 19, 1935.　　　M. H. MARTIN　　　2,021,797
CAR TRUCK
Filed March 7, 1934　　　3 Sheets-Sheet 3
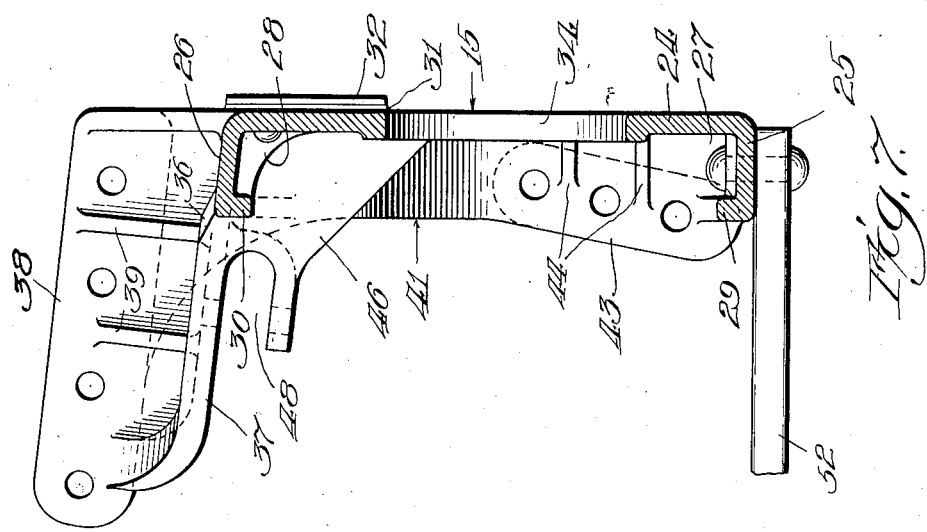
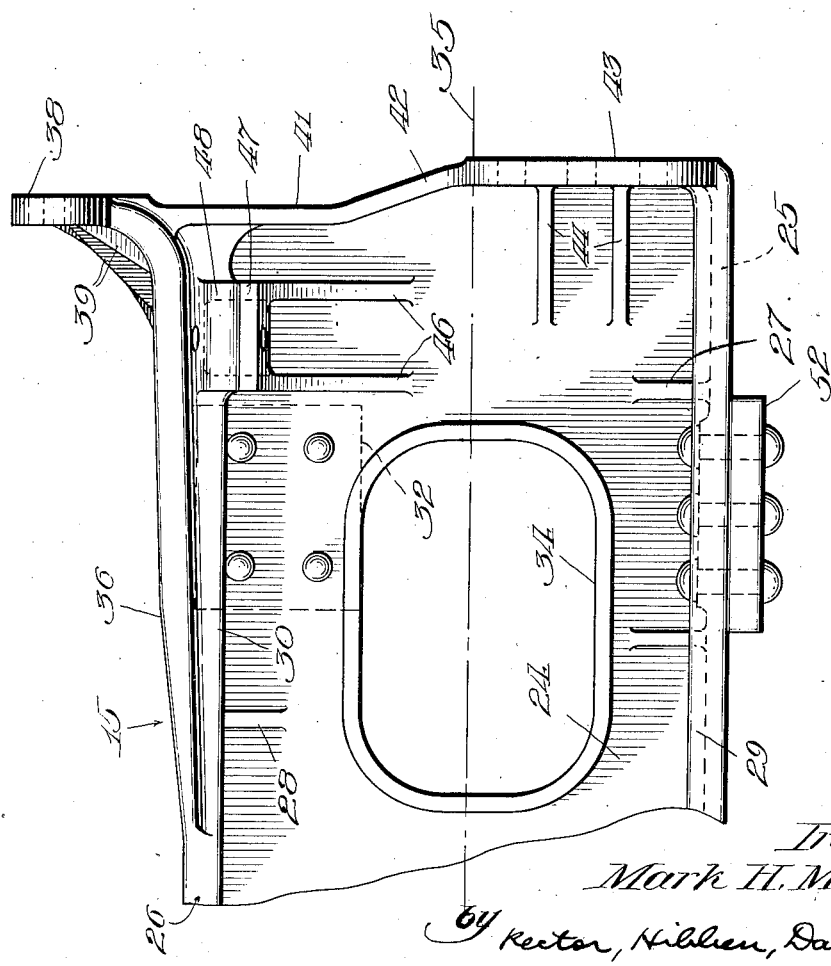
Inventor;
Mark H. Martin
By Rector, Hibben, Davis & Macauley
Attys.

Patented Nov. 19, 1935

2,021,797

UNITED STATES PATENT OFFICE 2,021,797

CAR TRUCK

Mark H. Martin, Reading, Pa., assignor to Birdsboro Steel Foundry & Machine Company, Birdsboro, Pa., a corporation of Pennsylvania Application March 7, 1934, Serial No. 714,367

6 Claims. (Cl. 105—190)

My invention relates to car trucks and is concerned more particularly with devising a truck embodying the general structural features of the truck disclosed in the United States Letters Patent to Kiesel, No. 1,649,352, but modified to permit the foundry manufacture of the major elements thereof.

The truck shown in the above patent is generally of the swing-motion type and is provided with a pair of side frames which are connected by a pair of pressed steel transoms, between which the bolster is swingably hung from the side frames. The purpose of employing pressed steel transoms is to achieve a certain amount of flexibility in the truck, and between the side frames thereof, in order that the truck might easily conform to any slight unevenness in the track. The use of such transoms, however, forbids their manufacture in a foundry, where the major elements of car trucks are customarily produced, so that such parts must be ordered elsewhere, or the foundry must add suitable machinery to its equipment for making these parts.

It is therefore one object of my invention to provide a truck of the type indicated in which the side frames are connected by cast transoms which are shaped and arranged to afford such a degree of flexibility as will permit a certain amount of weaving or relative movement between the side frames to better accommodate inequalities in track elevation, and particularly a degree of flexibility that is comparable to the pressed steel transoms.

A further object is to devise a cast transom which is rendered flexible to the extent desired by the proper disposition of a number of holes along the neutral axis and which is characterized by greater vertical stiffness than the pressed steel transom shown in the noted Kiesel patent.

A further object is to provide a cast transom having integrally formed therewith brake hanger brackets and means for attaching the transom to the side frames in the form of flanges or pads which are appropriately braced by, and connected to, the body of the transom by suitable webs and ribs.

These and further objects of my invention will be set forth in the following specification, reference being had to the accompanying drawings, and the novel means by which said objects are effectuated will be definitely pointed out in the claims.

In the drawings:

Fig. 3 is a section along the line 3—3 in Fig. 2, looking in the direction of the arrows, and showing one of the transoms in side elevation.

Fig. 4 is a view of one of the wear plates on the truck bolster as viewed in the direction of the arrow 4 in Fig. 1.

Fig. 5 is a section along the line 5—5 in Fig. 4, looking in the direction of the arrows.

Fig. 6 is an enlarged view of the right end of the transom shown in Fig. 3.

Fig. 7 is a section along the line 7—7 in Fig. 1, looking in the direction of the arrows.

Figure 1:
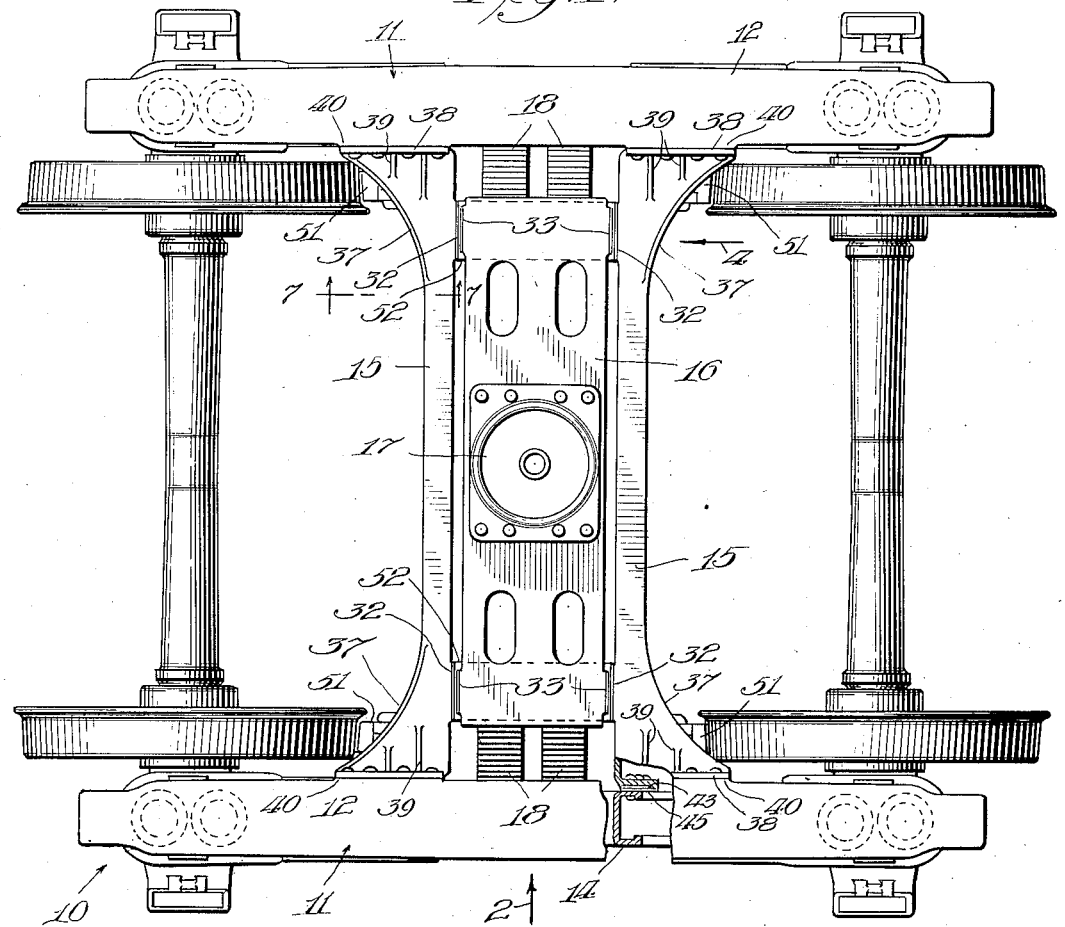
Figure 1 is a plan view of my improved truck, partly in section.
Figure 2:
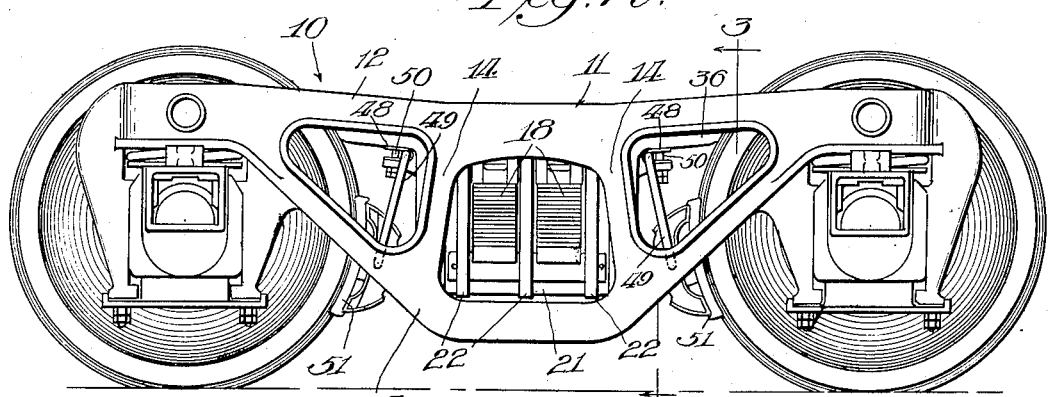
Fig. 2 is a side elevation of the truck, as viewed in the direction of the arrow 2 in Fig. 1.

Referring to the drawings, the numeral 10 designates my improved truck which is provided with side frames 11 of the pedestal type. Each side frame comprises a compression member 12, a tension member 13, and spaced struts 14 connecting these members. Preferably, the compression and tension members are formed as channel sections which open toward each other, while the struts 14 are also formed as channel sections which face outwardly from the window opening of each frame. The side frames are connected by a pair of spaced transoms 15 and located therebetween is a bolster 16 having the usual center plate 17.

The bolster is preferably of box section and mounted in each end thereof is a pair of leaf springs 18, the inner end of each spring resting upon a boss 19 provided on the lower web of the bolster, while the center band 20 of each spring contacts with the underside of the upper web of the bolster. The outer end of each spring rests upon a gib 21 which is supported in the lower ends of a plurality of swing links 22 whose upper ends are pivotally supported upon a pin 23 that is carried by the compression member 12.

Except for the particular construction of the transom 15, the parts above described, and their relation to each other, are substantially identical with those shown in the aforementioned Kiesel patent, and in and of themselves form no part of the present invention which relates more particularly to the transom per se, and its relation to the other parts of the truck.

Each transom 15 is a casting which is formed substantially as a channel section which faces outwardly from the bolster and which is formed with a vertical web 24, a lower flange 25, and an upper flange 26, the junction of these flanges with the web 24 being reinforced at suitable intervals by gusset webs 27 and 28, respectively. As a further reinforcing feature, the flanges 25 and 26 may be provided at their extremities with the inwardly-turned flanges 29 and 30, respectively.

Adjacent each end of the transom and the upper flange 26 thereof, there is provided a pad 31 to which is attached a wear plate 32 which is intended to cooperate with a corresponding wear plate 33 (see Figs. 4 and 5) which is riveted to the bolster.

The web 24 is further provided with a plurality of holes 34 which may possess any desired shape and which are preferably located along the neutral axis of the transom, represented by the numeral 35 in Fig. 6, in order to promote the flexibility of this member and to permit a certain amount of weaving of the side frames as the truck rolls over a track.

As indicated in Fig. 6, the upper transom flange 26 is canted slightly upwardly from the horizontal, as at 36, and adjacent each end of the transom, this flange is directed slightly upwardly and outwardly with respect to the horizontal center line of the transom, as viewed in Fig. 3. In plan view, as shown in Fig. 1, the flange 26 is also flared outwardly from the bolster, as indicated by the numeral 37, and subsequently merges into a vertical flange or pad 38 which serves as an upper attaching member for securing the transom to the side frame. In order to properly strengthen this pad with reference to the flange 26, as extended, suitable ribs 39 may be employed. Suitable rivets may be utilized to attach these pads to appropriate seats 40 (see Fig. 1) formed on each side frame.

Each end of the transom is defined by a flange 41 which is located substantially at right angles to the vertical web 24 and whose upper part is substantially in alignment with the attaching pad 38. Intermediate the flanges 25 and 26, the flange 41 is directed outwardly, as indicated by the numeral 42 in Fig. 6, and merges into a second attaching pad or flange 43 which is located adjacent the bottom of the transom and whose lower end merges into the lower transom flange 15. As indicated in Fig. 7, the attaching pad 43 may be directed slightly outwardly from the web 24 and its junction therewith is suitably reinforced by a gusset web 44. The pads 43 are also riveted to appropriate seats 45 provided on the inner face of each side frame. As clearly shown in Fig. 1, the vertical web of each transom, at the point of attachment of the pad 43 to the side frame, is substantially in alignment with the web portion of each strut 14.

Adjacent each end of the transom and the upper flange 26, thereof, a pair of spaced ribs 46 project from the outer side of the web 24 and extend upwardly for junction with the upper flange 26. The outer ends of these ribs are connected by a web 47 which is suitably curved to provide a U-shaped slot 48 for receiving the upper end of a brake hanger 49. This hanger is retained in position by means of a bolt 50 which is bridged between the outer end of the web 47 and the flange 26 extended, into which the web 47 merges, as indicated in Fig. 7. The lower end of each hanger 49 supports a brake shoe 51 in the usual manner.

A supporting bar 52 is bridged between the transoms at each end thereof and is riveted to the lower transom flanges 25. The purpose of this bar is to support the bolster in the event that any of its supporting parts break in transit, such as the springs 18, gib 21, swing links 22, or the pin 23.

I have ascertained that, by forming the transom as a casting with holes appropriately disposed throughout the length thereof, it is possible to achieve a degree of flexibility that is highly comparable to that afforded by the pressed steel transom shown in the Kiesel patent. Moreover, as indicated in the drawings, my improved transom has substantially uniform height throughout its length so that it is characterized by a greater stiffness than the pressed steel transom. Further, by casting the transom, it is possible to design a stronger association of the attaching pads 38 and 43 with the main body of the transom and hence secure a stronger tie between the side frames. Finally, the provision of integrally incorporating the brake hanger brackets with the transom obviates the necessity of making these parts as separate elements and thereafter riveting them to the transom.

I claim:

1. In a car truck, the combination of side frames, a pair of cast, substantially flexible, channel-shaped transoms connecting the frames and each transom having its extremities closed by end flanges, each end flange being upwardly extended to provide an upper, side frame, attaching pad and the lower portion of each end flange being arranged to provide a lower, side frame, attaching pad, a bolster disposed between the transoms, swing links depending from the compression members of the frames, and supporting springs connecting the bolster to the links.

2. In a car truck, the combination of side frames, a pair of cast channel-shaped transoms of substantially uniform height connecting the frames and each transom having its extremities closed by end flanges, each end flange being upwardly extended to provide an upper, side frame, attaching pad and the lower portion of each end flange being arranged to provide a lower, side frame, attaching pad, each of the transoms having a plurality of holes disposed along its neutral axis sufficient to impart a certain amount of flexibility thereto, a bolster disposed between the transoms, swing links depending from the compression members of the frames, and supporting springs connecting the bolster to the links.

3. In a car truck, the combination of side frames, a pair of cast, channel-shaped transoms connecting the frames and each transom having its extremities closed by end flanges, each end flange being upwardly extended to provide an upper, side frame, attaching pad and the lower portion of each end flange being arranged to provide a lower, side frame, attaching pad, each of the transoms having a plurality of holes located along its neutral axis sufficient to impart a certain amount of flexibility thereto, a bolster disposed between the transoms, swing links depending from the compression members of the frames, and supporting springs connecting the bolster to the links.

4. A transom for connecting the side frames of a car truck in the form of a casting having substantially a channel section and including a plurality of holes in the web thereof disposed along the neutral axis of the transom to promote its flexibility, the extremities of the transom being closed by end flanges, each end flange being upwardly extended to provide an upper, side frame, attaching pad and the lower portion of each end flange being arranged to provide a lower, side frame, attaching pad.

5. A transom for connecting the side frames of a car truck in the form of a casting having substantially a channel section and end flanges closing the extremities of the transom, each end flange being upwardly extended to provide an upper, side frame, attaching pad and the lower portion of each end flange being arranged to provide a lower, side frame, attaching pad, and integral brake hanger brackets in the form of U-shaped slots projecting laterally from the side of the casting, the upper wall of each slot being defined by a continuation of the upper, lateral wall of the transom.

6. A transom for connecting the side frames of a car truck in the form of a casting having substantially a channel section and including a plurality of holes in the web thereof disposed along the neutral axis of the transom to promote its flexibility, the exremities of the casting being closed by end flanges, each end flange being upwardly extended to provide an upper, side frame, attaching pad and the lower portion of each end flange being arranged to provide a lower, side frame, attaching pad, and integral brake brackets in the form of U-shaped slots projecting laterally from the side of the casting, the upper wall of each slot being defined by a continuation of the upper, lateral wall of the transom.

MARK H. MARTIN.